(No Model.)

I. ALLEGRETTI.
CONFECTION.

No. 585,372.  Patented June 29, 1897.

Witnesses,

Inventor,
Ignazio Allegretti

UNITED STATES PATENT OFFICE.

IGNAZIO ALLEGRETTI, OF CHICAGO, ILLINOIS.

CONFECTION.

SPECIFICATION forming part of Letters Patent No. 585,372, dated June 29, 1897.

Application filed March 3, 1897. Serial No. 625,832. (No specimens.)

*To all whom it may concern:*

Be it known that I, IGNAZIO ALLEGRETTI, of Chicago, Illinois, have invented certain new and useful Improvements in Confections, of which the following is a specification.

The object of my invention is to produce in a convenient and safe manner for exhibition and sale a confection which is a simulation of a well-known article of food.

The confection may be composed of chocolate of different colors and formed in close simulation of a fried egg, the colors of the cooked egg being produced by the white or colorless chocolate corresponding to the albuminous parts of the egg and of chocolate having an appropriate tint of yellow corresponding to the appearance of the yolk when cooked. These confections may be arranged in many forms, and to carry out the illusion I sometimes place upon a platter of such artificial eggs a strip of chocolate of different colors, producing a close simulation of a strip of bacon. In order to handle these eggs, which are of course easily broken, and to afford a convenient medium of sale, I place them in a small dish or platter of tin-plate or other suitable metal or material, and to prevent them sticking to the dish and also to enable them to be readily transferred to the dish I interpose a sheet of waxed paper. The confection will adhere sufficiently to the waxed paper to prevent its separation; and the paper and confection may be removed together and transferred to a plate without adhering to the platter or dish.

Figure 1:
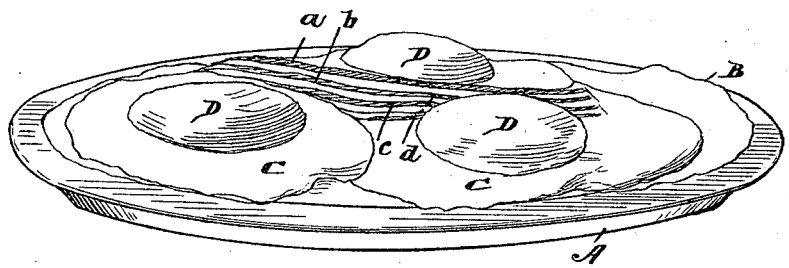
Figure 2:
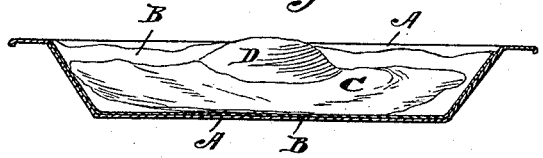

In the accompanying drawings, Figure 1 is a perspective view of a platter, showing a group of these artificial eggs with a strip of chocolate representing bacon thereon; and Fig. 2 shows a single artificial egg contained in a small dish or platter with a strip of waxed paper interposed, the dish and paper showing in section.

In carrying out my invention I take a suitable dish or shallow pan A, which may be of tin or other metal, and lay therein a strip of waxed paper B, so as to cover the bottom and, preferably, also the inclined walls of the pan. Upon this I arrange chocolate or other candy material, as shown at C, and which is white or colorless. These bodies C will be thin, of irregular outline, and may be made to simulate very closely the white or albuminous portions of the egg. Upon such portion colored chocolate D is placed and formed to represent the yolk of an egg. In Fig. 1 three of such artificial eggs are shown grouped together. A strip of chocolate of different colors (represented at *a b c d*) may thus be laid over the eggs and a very close simulation of bacon is produced. Instead of forming a confection to represent an egg cooked in the particular manner above indicated the colored and white portions of the chocolate may be mixed, and instead of the strip of chocolate representing bacon a strip of toasted bread or a confection representing the same may be employed. In all cases, however, I employ the waxed paper and the dish or receptacle, not only for the reason that the simulation is the more perfect, but also because I may thereby conveniently expose the confection for sale and may also prevent the eggs from breaking and enable them to be transferred from the dish or receptacle to a plate. The confection may be molded directly upon the waxed paper and then transferred to the pan, thus facilitating the handling.

I claim—

As a new article of manufacture, the herein-described confection, consisting of a shallow plate supporting a chocolate confection simulating in color and appearance a dish of cooked food, a sheet of waxed paper separating the two and on which said confection rests, and whereby it is prevented from breaking when and by which it may be conveniently removed from said support, as set forth.

IGNAZIO ALLEGRETTI.

Witnesses:
M. SALUSSOLIA,
Mrs. FREDERICKS.